(12) United States Patent
Brommer et al.

(10) Patent No.: US 7,631,744 B2
(45) Date of Patent: Dec. 15, 2009

(54) DEVICE FOR TRANSPORTING PRINTED PRODUCTS

(75) Inventors: Carsten Brommer, Tecklenburg/Leeden (DE); Torsten Meineke, Bassum (DE)

(73) Assignee: Kolbus GmbH & Co. KG, Rahden (DE)

( * ) Notice: Subject to any disclaimer, the term of this patent is extended or adjusted under 35 U.S.C. 154(b) by 180 days.

(21) Appl. No.: 12/006,748

(22) Filed: Jan. 4, 2008

(65) Prior Publication Data

US 2008/0169170 A1 Jul. 17, 2008

(30) Foreign Application Priority Data

Jan. 12, 2007 (DE) .................. 10 2007 001 800

(51) Int. Cl.
*B65G 47/10* (2006.01)
(52) U.S. Cl. ................ 198/370.09; 198/370.1
(58) Field of Classification Search ............ 198/370.09, 198/370.1
See application file for complete search history.

(56) References Cited

U.S. PATENT DOCUMENTS

| | | | | |
|---|---|---|---|---|
| 4,730,718 | A * | 3/1988 | Fazio et al. ............... | 198/370.1 |
| 4,798,275 | A * | 1/1989 | Leemkuil et al. ......... | 198/370.1 |
| 5,609,236 | A * | 3/1997 | Neukam .................... | 198/370.1 |
| 6,223,880 | B1 * | 5/2001 | Caspi et al. ............. | 198/370.09 |
| 6,230,872 | B1 * | 5/2001 | Huang et al. ............. | 198/368 |
| 6,464,064 | B1 * | 10/2002 | Rieg et al. .............. | 198/370.09 |
| 6,581,749 | B2 * | 6/2003 | Wood et al. ............. | 198/370.09 |

FOREIGN PATENT DOCUMENTS

| | | |
|---|---|---|
| DE | 105 173 | 4/1974 |
| DE | 28 43 599 | 4/1979 |
| EP | 1 380 523 A1 | 1/2004 |

* cited by examiner

*Primary Examiner*—James R Bidwell
(74) *Attorney, Agent, or Firm*—Alix, Yale & Ristas, LLP

(57) ABSTRACT

A device for transporting printed products, particularly folded and/or unfolded sheets, comprising a conveying unit with several driven endless conveying belts that are arranged parallel to one another and a roller conveyor with several rollers that are respectively arranged between the endless conveying belts. The roller conveyor can be raised and lowered relative to the conveying unit and the vertical lifting movement of the roller conveyor is superimposed with a comparatively much larger movement parallel to the axial direction of the rollers. Such a lifting movement provides the advantage that the printed products are deposited onto the continuous endless conveying belts such that they are pre-accelerated in the transport direction or lifted off the conveying belts with the transport component in order to subsequently be gently decelerated up to the end of the lifting movement.

20 Claims, 2 Drawing Sheets

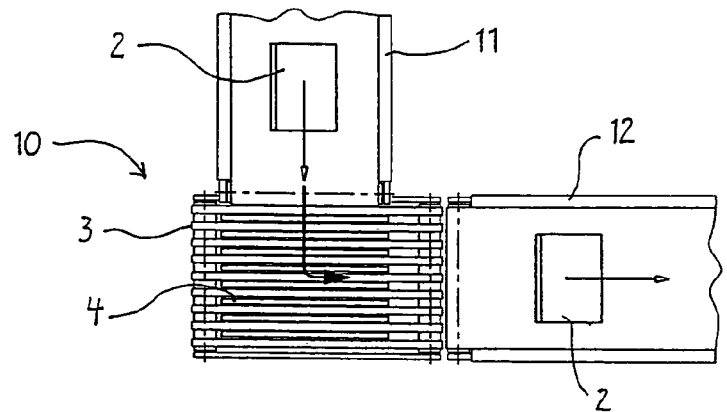
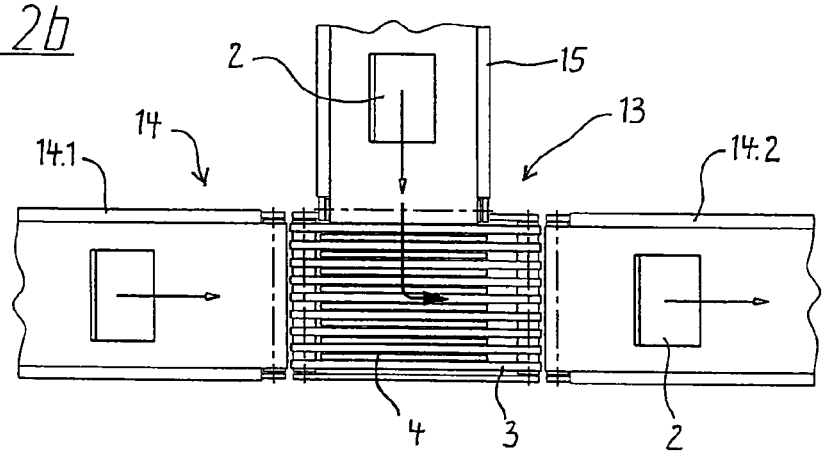
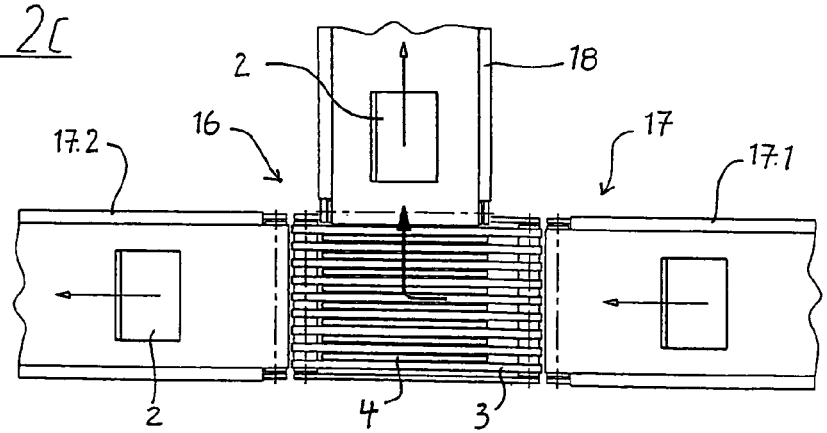

DEVICE FOR TRANSPORTING PRINTED PRODUCTS

BACKGROUND

The present invention pertains to a device for transporting printed products such as book blocks, books or stacks of printed matter, particularly folded and/or unfolded sheets, with a conveying system having several driven endless conveyors arranged in parallel.

A device of this type is known from patent DD 105 173. On a section of a roller conveyor, transport elements that can be driven transverse to transport rollers driven in the transport direction, e.g., transport chains that revolve transverse to the transport direction, can be raised above the upper plane of the transport rollers and lowered below this plane between the transport rollers that are driven in the conveying direction. This device makes it possible to transfer objects transported on a continuous roller conveyor to roller conveyors arranged perpendicular thereto or to transfer objects to the continuous roller conveyor from roller conveyors arranged perpendicular thereto in certain regions of the roller conveyor.

de 28 43 599 A1 describes a transport device for book blocks or books, in which driven rollers are arranged between revolving belts of a pivoted belt system such that their axes approximately extend along the transport direction of the belts and the transport plane of the rollers that are rigidly supported in the frame lies underneath the transport plane of the belt in the upper pivoting position of the belt system and above the transport plane of the belts in the lower pivoting position of the belt system. The belt system is realized in the form of a conveying section in a transport path composed of conveyor belts. The rollers can transfer a printed product to a conveyor belt arranged perpendicular to the transport path by pivoting the belt system downward. The conveying device could conceivably also operate in reverse in the sense of an inward transfer.

Various outward transfer principles are systematically illustrated in VDI Guideline 2340.

One disadvantage of the aforementioned devices can be seen in that a gentle inward and outward transfer or cross-conveying, especially of sensitive individual products such as book blocks, books or stacks of printed matter, particularly consisting of folded and/or unfolded sheets, or of similar printed products cannot be ensured. The printed products are subjected to abrupt changes in the transport direction and acceleration processes that inevitably cause slippage when they are lifted off or deposited onto continuous conveyors such that marking of the surfaces or deformation or even the destruction of the printed products or stacks can occur.

EP 1 380 523 A1 discloses a transfer device for individual products to be transported, in which a conveying means that transports toward the transfer device is lifted off the transport plane and decelerated by means of braking rails that can be raised and lowered. The slightly lowered braking rails subsequently transfer the product to be transported to the roller conveyor that is simultaneously raised above the transport plane in order to laterally transport away the product. The lifting movements of the braking rails and of the roller conveyor are respectively realized with parallelogram lifting mechanisms and motion-coupled in that the oscillating levers arranged on identical pivoting axes are fixed at a defined angle relative to one another. In the lower starting position, the oscillating levers of the parallelogram lifting mechanism of the roller conveyor are approximately oriented parallel to the transport plane while the oscillating levers of the parallelogram lifting mechanism of the braking rails are oriented directly in front of their vertical zenith position. The common pivoting of the aforementioned oscillating levers causes the roller conveyor to carry out a vertical movement with a comparatively small horizontal component while the braking rails are initially raised above their zenith position and then minimally lowered. The horizontal movement of the braking rails is used for pushing a product to be transported which is decelerated on the braking rails against a stopping element and thusly aligning said product.

This transfer device is suitable for the outward transfer as well as the inward transfer of products to be transported. During an outward transfer, the raised product to be transported is decelerated by the braking rails. During an inward transfer, the product is pre-accelerated in the subsequent transport direction due to the horizontal movement of the braking rails that takes place simultaneously with the lowering movement. However, the complicated construction with two parallelogram lifting mechanisms is considered disadvantageous in this transfer device. Due to the motion coupling and the initial upward motion of the braking rails during their return movement, the lowering of the braking rails cannot take place until the product to be transported is transported away from the transfer point in its entirety because it would otherwise be decelerated once again by the braking rails. This results in capacity limitations.

SUMMARY

The present disclosure is directed to a device for transporting printed products of the type generally described above, which has a simple construction and allows the flawless and reliable cross-conveying and/or inward/outward transfer of the sensitive printed products.

This is attained with a roller transfer conveyor that can be raised and lowered and the vertical lifting movement of which is superimposed with a comparatively much larger movement parallel to the axial direction of the rollers or to the transport direction of the conveying unit, respectively.

Such lifting movement provides the advantage of depositing printed products onto the continuous endless conveying means in such a way that they are pre-accelerated in the transport direction or lifted off the conveying unit with the transport component in order to be subsequently decelerated up to the end of the lifting movement. This means that the cross-conveying can be carried out such that the product is handled much more gently. In addition, the inward and outward transfer into and out of a product stream can take place at higher transport speeds of the product stream.

The advantage of a simple construction is achieved by raising and lowering the roller conveyor rather than the conveying unit. The transport rollers of the roller conveyor not only provide the cross-conveying of the products, but also provide for their respective pre-acceleration and deceleration. Braking means that require additional controls therefore can be eliminated.

The lifting movement preferably takes place in the form of a parallel displacement such that the printed products are completely lifted off the conveying unit or deposited thereon in the instant in which they are deposited or lifted off. In this way their edges are not subjected to the stresses that would occur if they were lifted off or deposited obliquely. The lifting movement can be easily realized with the aid of a parallel crank mechanism, wherein the roller conveyor is arranged on the coupling of the parallel crank mechanism and the cranks are approximately oriented in their vertical zenith position when the roller conveyor is raised. The parallel crank mechanism is preferably driven such that it pivots back and forward within a defined angular range in order to define the upper and the lower end position of the lifting movement, as well as the horizontal transport component.

The advantage of a largely slip-free transfer of the printed products is achieved by realizing the rollers with a high frictional resistance relative to the printed products to be transported, namely at least in their axial direction. This makes it possible to accelerate and decelerate the printed products over a relatively short transport section.

The printed products are preferably transported toward or away from the roller conveyor essentially perpendicular to the transport direction of the conveying unit by an additional conveying device. The printed products can simply be pushed onto or off the raised roller conveyor by a pusher element of the additional conveying device. The advantage of a defined positing of the products in the transverse direction is achieved by realizing a stop situated opposite of the pusher element such that it can be positioned on the conveying unit. The printed products can also be transported toward and away from the roller conveyor by rotatively driving the rollers of the roller conveyor.

The differential speed between the roller conveyor and the conveying unit in the instant of the effective transfer of the printed products can be additionally reduced by driving the conveying unit with a swelling transport speed gradient, wherein the printed products are deposited on or lifted off the conveying unit at a slow speed.

The conveying unit with the roller conveyor that can be raised and lowered arranged therein may be used as a cross-conveyor in a transport section. It may also be realized in the form of a partial transport section on a transport path, on which the products are transported in the same direction, in order to realize the inward transfer of printed products supplied to the roller conveyor into the transport path. Alternatively, the conveying unit with the roller conveyor that can be raised and lowered arranged therein may also be used for the outward transfer of printed products transported on the transport path.

BRIEF DESCRIPTION OF THE DRAWING

Preferred embodiments are exemplified in the accompanying drawing, in which:

FIG. 2a shows a top view of a conveying unit with a roller conveyor that can be raised and lowered arranged therein, in the form of a cross-conveyor;

FIG. 2b shows an identical view of a conveying unit in the form of an inward transfer conveyor for a transport path; and FIG. 2c shows a top view of a conveying unit with a roller conveyor that can be moved in accordance with an aspect of the invention, in the form of an outward transfer conveyor for a transport path.

DETAILED DESCRIPTION

Figure 1:
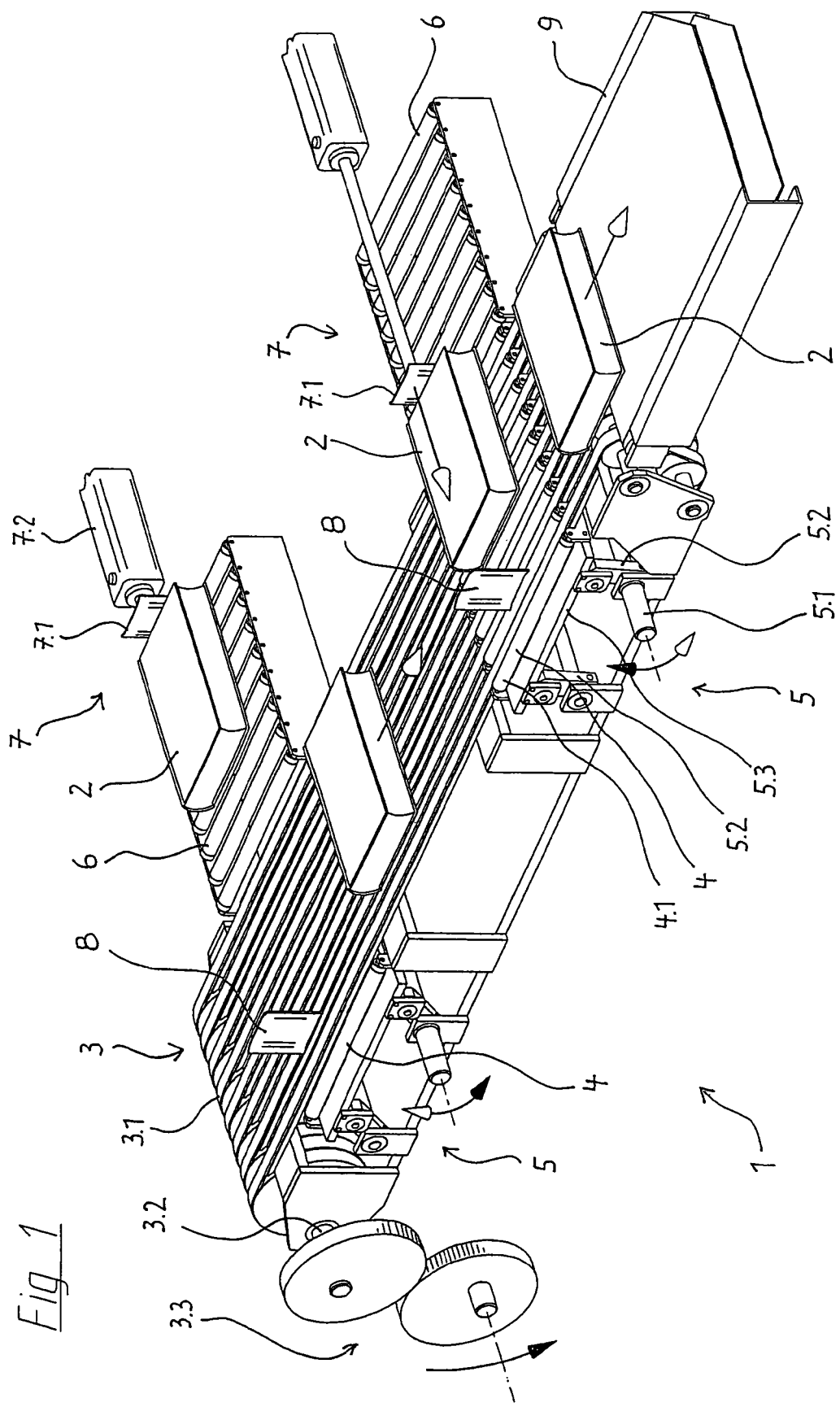
FIG. 1 shows a perspective representation of a conveying unit with two roller conveyors that are spaced apart from one another and can be moved in accordance with an aspect of the invention.

As used herein, the term "printed book products" includes book blocks, books or stacks of printed matter, having folded and/or unfolded sheets. The conveying unit for printed book products according to FIG. 1 is realized in the form of a main belt conveyor 3 for a books, in connection with two roller transfer conveyors 4 that are spaced apart from one another and can be moved in accordance with an aspect of the invention, intended as a combining conveyor 1 for combining books 2 supplied from two not-shown sources. The sources may consist, for example, of processing machines that operate in parallel and carry out the final processing steps on the books, e.g., joint forming or full surface pressing. In the embodiment shown, the respective books 2 are flatly deposited onto assigned roller conveyors 6 with a 180° offset in phase and subsequently fed to the respective roller conveyor 4 of the combining conveyor 1.

The belt conveyor 3 comprises a multitude of conveyor belts 3.1 that are arranged parallel to one another and driven by a common drive shaft 3.2. The two roller conveyors 4 respectively feature freely rotatable, cylinder-shaped support rollers 4.1 that are respectively arranged between the conveyor belts 3.1 such that their rotational axes extend parallel to the conveying direction of the belt conveyor 3.

The inventive lifting movement of the roller conveyors 4 is realized with the aid of parallel crank mechanisms 5 that respectively comprise cranks 5.2 supported in the frame of the belt conveyor 4 and a coupler 5.3 arranged on the free ends of the cranks 5.2. One of the cranks 5.2 is respectively connected to a drive shaft 5.1 that is rotatively driven back and forward by means of a not-shown drive unit such that the coupler 5.3 with the roller conveyor 4 arranged thereon carries out a translatory upward and downward movement.

According to FIG. 1, the roller conveyor 4 is situated above the conveyor belts 3.1 in the raised or lifted position and forms a common transport plane with the respectively assigned roller conveyor 6 such that a book 2 situated on the roller conveyor 6 can be transferred to the roller conveyor 4. This is realized with the aid of a feeding device 7 having a slide 7.1 that can be moved back and forward by a pneumatic cylinder 7.2 and transfers the book 2 to the roller conveyor 4 in sync with the lifting movement thereof. A transfer position that is defined transverse to the transport direction of the belt conveyor 3 is ensured by means of a correspondingly positioned stop 8.

The parallel crank mechanism 5 is approximately situated in its zenith position when the roller conveyor 4 is raised. The lowering movement from this position therefore features an additional transport component in the transport direction of the belt conveyor 3 such that the books 2 that are situated on the roller conveyor 4 and need to be transferred onto the belt conveyor 3 are pre-accelerated in the transport direction thereof.

The differential speed between the roller conveyor 4 and the belt conveyor 3 in the instant of the effective transfer of the books 2 is additionally reduced due to the fact that the belt conveyor 3 is driven with a swelling transport speed gradient (i.e., varying between relatively faster and slower speeds) by an elliptical gearing 3.3, wherein the books 2 are deposited onto the belt conveyor 3 at a slow speed. Since the books 2 are deposited onto the roller conveyors 6 offset in phase, they can be alternately fed to the combining conveyor 1 as illustrated in FIG. 1. The books 2 are combined into a continuous book stream and subsequently transferred to a constantly driven conveyor belt 9 in order to be additionally transported to downstream subsequent processing machines.

The inventive transport device makes it possible to realize, in principle, the gentle cross-conveying, inward transfer and outward transfer of the respective products. FIG. 2a shows a cross-conveyor 10 that is composed of a belt conveyor 3 and a conveyor belt 11 that can be moved upward and downward, wherein this cross-conveyor receives the books 2 from a conveyor belt 11 and transfers the books from this conveyor belt to a conveyor belt 12 for their additional transport.

FIG. 2b shows an inward transfer conveyor 13 that is realized in the form of a partial transport section of a transport path 14 composed of conveyor belts 14.1, 14.2. Books 2 are supplied by a conveyor belt 15 and inwardly transferred into a corresponding gap of the product stream by means of the roller conveyor 4 of the inward transfer conveyor 13.

FIG. 2c shows the belt conveyor 3 with the roller conveyor 4 that can be moved upward and downward in the form of an outward transfer conveyor 16, by means of which the books 2 can be removed from the transport path 17 formed by the conveyor belts 17.1 and 17.2 in order to transfer the books to a conveyor belt 18 arranged transverse thereto. The books 2 are lifted off the belt conveyor 3 by means of the roller conveyor 4, wherein the roller conveyor 4 features a transport component in the transport direction of the transport path 17 in the instant of the transfer so as to realize the smallest relative speed possible between the belt conveyor 3 and the roller conveyor 4 in the instant in which the books are lifted off.

In the embodiments in the form of a cross-conveyor 10, an inward transfer conveyor 13 and an outward transfer conveyor 16 which are illustrated in the figures, the rollers 4.1 of the roller conveyor 4 that can be raised and lowered are preferably driven in order to respectively transport the books 2 into and out of the transfer position. However, the cross-conveying could also be realized with the slide 7 provided in the combining conveyor 1 according to FIG. 1 which, as an alternative to the described pneumatic actuation, could also be driven by an electric motor.

The invention claimed is:

1. A device for transporting printed book products, comprising:
   a main conveying unit having a multiplicity of driven endless conveying bands that are arranged parallel to one another in a main conveying direction;
   a roller transfer conveyor having a plurality of rollers that are respectively arranged between the endless conveying bands, and have rotational axes oriented parallel to the main conveying direction of the main conveying unit;
   said roller transfer conveyor having a vertical lifting and lowering movement spanning a vertical lift distance, whereby the rollers ascend above and descend below said bands, the vertical lifting being superimposed with a transfer movement of the rollers over a transfer distance in the main conveying direction greater than the vertical lift distance.

2. The device according to claim 1, wherein the lifting movement of the roller transfer conveyor is a parallel displacement of the rollers.

3. The device according to claim 1, wherein the roller transfer conveyor is operatively connected to a parallel crank mechanism with the rollers arranged on the coupler of the crank mechanism and the cranks oriented in their approximate vertical zenith position when the roller conveyor is lifted.

4. The device according to claim 3, wherein the parallel crank mechanism is driven such that it pivots back and forward generally along the main conveying direction within a defined angular range.

5. The device according to claim 1, wherein the rollers generate a frictional resistance on the printed products, thereby realizing a largely slip-free transfer of the printed products at least in a direction along the roller axes.

6. The device according to claim 1, including an additional conveying device that transports the printed products toward or away from the roller transfer conveyor in an essentially perpendicular direction relative to the main conveying direction.

7. The device according to claim 6, wherein the printed products are pushed onto or off the lifted roller transfer conveyor by a pusher element of the additional conveying device.

8. The device according to claim 7, wherein a stop lying opposite of the pusher element can be positioned on the main conveying unit while the printed products are pushed on.

9. The device according to claim 1, wherein the rollers of the roller transfer conveyor can be rotatively driven.

10. The device according to claim 1, wherein the bands of the main conveying unit are driven with a transport speed gradient that varies between relatively fast and relatively slow speeds, and the effective transfer of the printed products takes place at the time at which the bands are driven with a relatively slow speed.

11. The device according to claim 1, wherein the main conveying unit with the roller transfer conveyor are configured as a cross-conveyor.

12. The device according to claim 1, wherein the main conveying unit with the roller transfer conveyor are configured as a partial transport section that transfers printed products inwardly from the roller transfer conveyor onto a transport path along the main conveying direction that extends upstream and downstream of said main conveying unit.

13. The device according to claim 1, wherein the main conveying unit with the roller transfer conveyor are configured as a partial transport section that transfers printed products from the main conveying unit outwardly off a transport path along the main conveying direction that extends upstream and downstream of said main conveying unit.

14. The device according to claim 2, wherein the roller transfer conveyor is operatively connected to a parallel crank mechanism with the rollers arranged on the coupler of the crank mechanism and the cranks oriented in their approximate vertical zenith position when the roller conveyor is lifted.

15. The device according to claim 14, wherein the parallel crank mechanism is driven such that it pivots back and forward generally along the main conveying direction within a defined angular range.

16. The device according to claim 2, wherein the rollers generate a frictional resistance on the printed products, thereby realizing a largely slip-free transfer of the printed products at least in a direction along the roller axes.

17. The device according to claim 3, wherein the rollers generate a frictional resistance on the printed products, thereby realizing a largely slip-free transfer of the printed products at least in a direction along the roller axes.

18. The device according to claim 2, including an additional conveying device that transports the printed products toward or away from the roller transfer conveyor in an essentially perpendicular direction relative to the main conveying direction.

19. The device according to claim 18, wherein the printed products are pushed onto or off the lifted roller transfer conveyor by a pusher element of the additional conveying device.

20. The device according to claim 19, wherein a stop lying opposite of the pusher element can be positioned on the main conveying unit while the printed products are pushed on.

* * * * *